Patented June 30, 1953

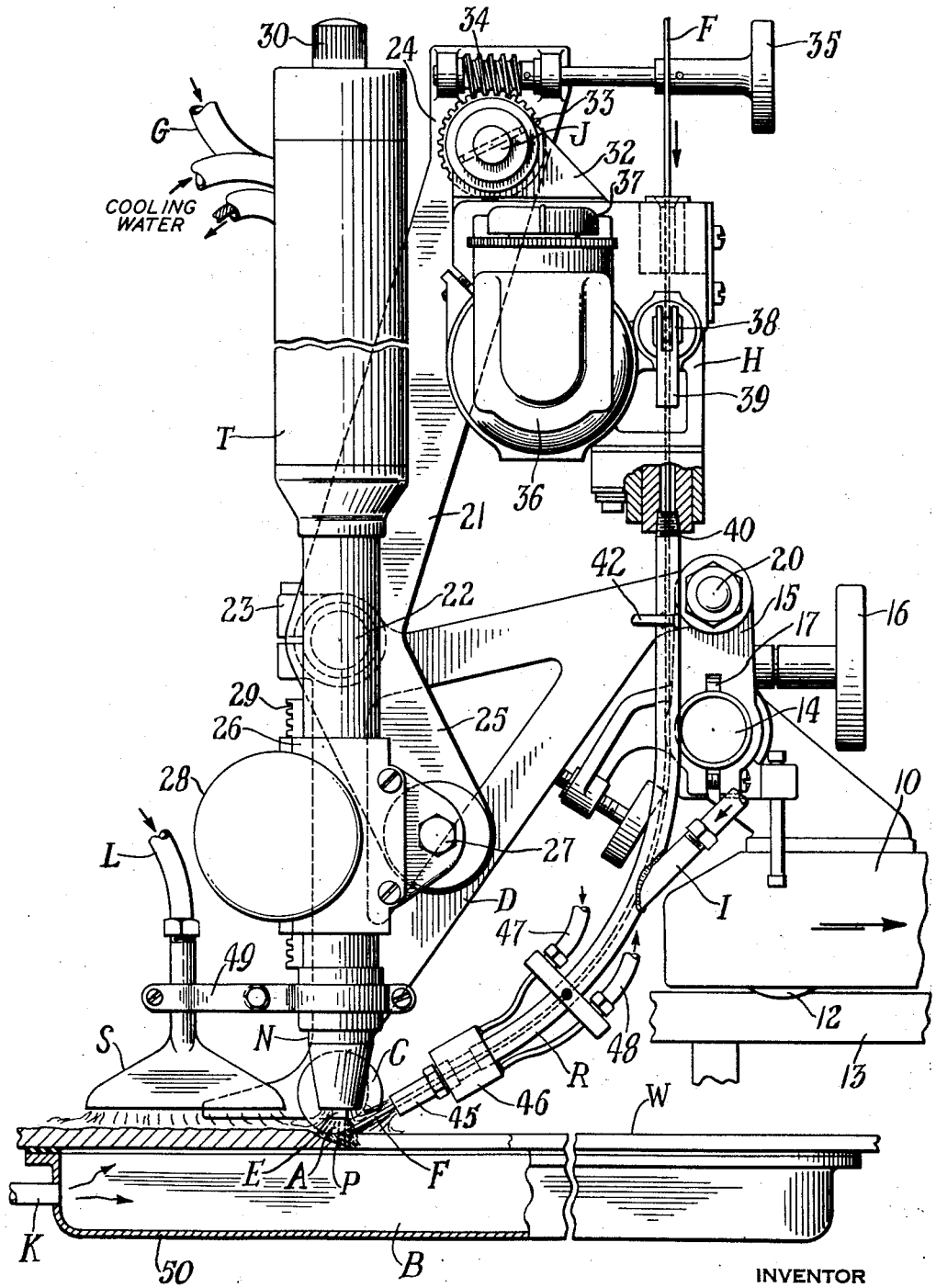

2,644,070

UNITED STATES PATENT OFFICE 2,644,070

INERT GAS BLANKETED WELDING ROD FEED

Harry T. Herbst, Belleville, N. J., assignor, by mesne assignments, to Union Carbide and Carbon Corporation, a corporation of New York Original application September 5, 1946, Serial No. 695,012, now Patent No. 2,496,347, dated February 7, 1950. Divided and this application June 23, 1949, Serial No. 100,872

4 Claims. (Cl. 219—10)

This application is a division of my copending parent application Serial No. 695,012, filed September 5, 1946, now U. S. Patent 2,496,347, granted February 7, 1950.

This invention relates to electric welding, and more particularly to method and apparatus for the electric welding of non-ferrous metals and their alloys and stainless steel, which are difficult, unsatisfactory, or impossible to weld by the conventional processes of welding iron and steel, because of contamination of the weld by oxides, nitrides or other combinations of the weld metal with constituents of the air or other atmosphere surrounding the welding zone.

In welding such metals, the molten portions of the adjacent metal parts being welded have been blanketed with an inert gas, preferably a noble monatomic gas such as helium or argon, and particularly when thicker parts are being welded, a filler rod has been supplied to the welding zone. It has been found that when such filler rod is employed, it is difficult to maintain the quality of the weld as high as that obtained without the addition of the rod. A considerable part of such difficulty is that contamination of the weld puddle may be brought about by oxidation of the filler rod as it approaches the puddle, near enough to receive heat from the welding operation, but not sufficiently close to be protected from atmospheric oxygen by the inert gas blanketing the weld puddle.

Furthermore, particularly when thin sheet metal is being welded with or without filler rod, the heat of the welding operation passes through to the underside of the sheet metal being welded and heats it above its oxidation temperature. Thus even if the inert gas blanketing the weld puddle protects the upper surface of the weld, the lower surface is subject to oxidation or other contamination.

It has also been found that inasmuch as the blanket of inert gas advances along the seam with the welding operation, the welded joint is left behind and unblanketed while it is still in heated condition above its oxidation temperature, and therefore subject to contamination before it has time to cool.

It is therefore the main object of the present invention to protect from oxidation or other chemical action the metal subjected to the heat of the welding operation which is not protected by the inert gas which protects the weld puddle.

While increased protection may be provided by considerably increasing the flow of gas blanketing the weld puddle, resulting in sufficient spread of gas to envelop the filler rod and the welded joint far enough back to prevent atmospheric oxidation, this expedient results in a considerable wastage of inert gas.

More particular objects are therefore to confine a stream of inert gas to surround the filler rod on its way to the welding operation, to confine a stream of inert gas to blanket the welded joint after the arc has passed but before the weld puddle has cooled below its oxidation temperature, and to provide a backing of inert gas to protect the underside of the metal being welded against atmospheric contamination.

With regard to the filler rod, instead of or supplemental to a stream of inert gas surrounding the same, contamination of the filler rod may be avoided by preventing the filler rod from reaching its oxidation temperature before it reaches the welding zone, and it is therefore another object to subject the filler rod to a cooling operation before it reaches the welding zone.

Other objects are to provide a supplemental stream of inert gas moving with the arc enveloping stream, to provide a gas blanketed filler rod, to provide a cooling jacket through which the filler rod is fed, to maintain constant arc length, to adjust the speed of the rod feed and the welding operation, and to adjust the position or direction of the rod feed as to angle with respect to the work surface, height above the work, and lateral disposition with respect to the line of weld.

According to the present invention, electric welding current is supplied to a welding zone of the metal parts to be welded, filler rod is fed to the welding zone, and the filler rod is blanketed with inert gas before it reaches the welding zone. Preferably an arc is maintained between a tungsten, molybdenum, or other refractory metal electrode and the adjacent metal parts to be welded, an annular stream of inert gas is passed along the electrode surrounding the arc to blanket the weld puddle, and a stream of inert gas is confined and directed to blanket the heated metal outside of the arc weld puddle blanket.

In the preferred embodiment, the filler rod is blanketed with inert gas before it reaches the welding zone by feeding the filler rod through a tube, which maintains an annular stream of inert gas surrounding the rod being fed. The welding current is supplied to a gas blanketed arc welding torch mounted on a carriage by which it is propelled at constant but normally adjustable speed. The filler rod is fed by a feeding mechanism driven by a motor having a governor adjustable to maintain a constant selected speed. Contiguity of the rod and work at the edge of the puddle is accomplished by a guide nozzle. The angle of the filler rod with the workpiece is determined by adjusting the position of the tube, and may be from 0 to 180 degrees, which includes both backhand and forehand feeding of the filler rod. An angle of from 15 to 30 degrees is preferred in some instances, but with for example stainless steel, from 30 to 40 degrees works better than the shallower angles, up to 60 degrees being feasible. The tube is pivoted on a vertical axis about which it is laterally adjustable to align it with the line of weld, and vertical adjustment is obtained by a manually operable raising and lowering means. Constant arc length is provided by a plate rider wheel, which is adjustable for height to select the arc length.

In the drawing, the single figure is a side elevation of apparatus according to, and for carrying out the method of, the present invention.

In the preferred embodiment shown, the electric welding current is supplied to the welding zone or puddle P at the adjacent or abutting edges of the workpieces W to be welded, which are composed of the class of metals difficult to weld, comprising non-ferrous metals and their alloys and stainless steel, particularly magnesium and aluminum. Inert gas, such as helium or argon, is supplied by a conduit G through a nozzle N which directs the inert gas to blanket the welding zone or puddle P.

Preferably the welding current passes between the work W and a tungsten, molybdenum or other suitable electrode E centered in the nozzle N and forms an arc A, which melts adjacent edges of the work W and forms the puddle P; the electrode E, arc A and puddle P being protected by the inert gas issuing from the nozzle N from contamination by the surrounding atmosphere. Filler rod F is supplied to the puddle P, the filler rod ordinarily being composed of the same metal as the workpieces W being welded, whether non-ferrous metals or their alloys or stainless steel.

The nozzle N and electrode E are preferably carried by a torch T, which may be of conventional construction, and filler rod F is supplied through a tube R, which also receives inert gas from a conduit I, and projects an annular stream of inert gas along the filler rod F to protect the same from contamination on its way to the weld puddle P and also to shield the forward part of the rod F from the radiant heat of the arc and thereby protect it from overheating. The flow of inert gas through the nozzle N of the conventional torch T is normally about 12 litres of argon per minute. To protect the filler rod F by merely increasing this flow would require about 20 litres of argon per minute. Instead, the supplemental flow through the tube R is only about 4 litres per minute. The gas from the tube R in addition to protecting the rod F, combines with the gas from the nozzle N to help blanket the welding zone, so that less than the volume of gas otherwise required need be discharged from the nozzle N.

The streams of gas from the tube R and nozzle N may be sufficient to protect the welded joint behind the puddle P, but if not a supplemental nozzle S may be provided which receives inert gas from a conduit L. The nozzle S projects a stream of inert gas onto the line of weld in tandem relation following the main stream from the main nozzle N, to blanket the welded joint after the arc has passed on.

When it is desired to protect the underside of the work W, an inert gas backing blanket B is provided by confining inert gas from a conduit K to cover the underside of the work. The conduits G, I, L, and K preferably receive the same inert gas from the same source.

The torch T is carried by a plate rider bracket D having a roller C to engage the work whereby constant arc length is maintained. The tube R is also mounted on the bracket D as part of the rod feeding mechanism H which is pivoted as a unit about a shaft J to advance or retract the tube and its rod with respect to the arc A and weld puddle P. The tube R is swiveled with respect to the feeding mechanism H for lateral movement to center it with respect to the line of weld.

The welding mechanism is propelled along the joint to be welded by a carriage 10 which may be, for example, the self-propelled carriage of a portable oxy-acetylene cutting machine. The carriage has wheels 12 rolling on tracks 13 and carries a transverse shaft 14 rigidly mounted thereon. A cross slide 15 is mounted on the shaft 14 and is adjustable therealong by a handwheel 16 turning a gear meshing with a rack 17 fixed on the shaft 14. The cross slide 15 has a trunnion 20 which forms the pivot for the plate rider bracket D.

The welding mechanism is supported on the plate rider D by means of a frame plate 21, which is carried by a stub shaft 22 adjustably secured in a clamp 23 on the plate rider bracket. The frame plate 21 has an upwardly extending arm 24 which carries the stub shaft J for supporting the rod feeding mechanism H. The frame plate 21 also has a depending arm 25 which supports the torch T. The torch T is preferably of the type disclosed in my Patent No. 2,468,807.

Adjustably mounted on the arm 25 is a torch holder 26, which is clamped in position by a bolt 27. The torch T is mounted in the torch holder 26, and a handwheel 28 turns a gear meshing with a rack 29 on the torch, to raise and lower the same. The electrode E may be advanced by turning a knob 30 at the top of the torch T.

A frame 32 is pivoted on the stub shaft J to support the feeding mechanism H. Rigidly secured to the frame 32 and pivoted on the shaft J is a worm wheel 33 meshing with a worm wheel 34 journaled on the plate rider extension 24, and adjustable by a handwheel 35.

The feeding mechanism H comprises a motor 36, having an eddy current governor 37 manually adjustable to control the rate of rod feed, which drives one of a pair of feed rolls 38, one of which is movable toward the other by a handle 39, to form a driving clutch.

The feed mechanism H advances the rod F through the guide tube R, which is swiveled at 40 to the casing of the drive mechanism. A handle 42 is movable to turn the guide tube R about the swivel 40, effecting a lateral movement to center the rod F on the line of weld.

The guide tube R terminates in a guide nozzle 45 for directing the rod F, and directing an annular stream of inert gas along the filler rod.

For cooling the filler rod below its oxidation temperature, a cooling jacket 46 is provided on the guide nozzle 45, and maintains an annular stream of cooling medium surrounding the filler rod F. Cooling medium such as water is supplied by a conduit 47, and the heated medium is discharged through a conduit 48.

The supplemental nozzle S for projecting inert gas onto the welded joint after the arc has passed on, comprises an elongated or slotted nozzle aligned with the line of weld, and carried by a clamp 49 secured to the torch T.

The inert gas blanket B for protecting the underside of the work W is confined by a pan or trough 50 which extends longitudinally under the line of weld, and may be movable with the torch T relative to the workpieces W.

I claim:

1. Method of inert gas blanketed arc welding metals which comprises maintaining an electric arc between the tip of an electrode and a welding zone of the metal to be welded, passing an annular stream of gas containing essentially inert noble monatomic gas along and concentric with the electrode to blanket the arc and molten portions of said metal during the welding operation, advancing said welding zone and blanket along a line of weld, and advancing a separate stream of gas containing essentially inert noble monatomic gas apart from but in tandem with said first mentioned stream on the same side of the metal being welded and distributed along the line of weld to blanket the welded joint following behind said welding zone.

2. Apparatus for inert gas blanketed arc welding metals which comprises means for maintaining an electric arc between the tip of an electrode and a welding zone of the metal to be welded, means for passing an annular stream of gas containing essentially inert noble monatomic gas along and concentric with the electrode to blanket the arc and molten portions of said metal during the welding operation, means for advancing said welding zone and blanket along a line of weld, and means for advancing a separate stream of gas containing essentially said inert noble monatomic gas apart from but in tandem with said main stream on the same side of the metal being welded and distributed along the line of weld to blanket the welded joint following behind said welding zone.

3. In apparatus for inert gas shielded arc welding in which the arc forms a weld puddle, the weld puddle is blanketed by an inert gas projected from a nozzle, and a filler rod is fed to the weld puddle, the improvement which comprises an elongated nozzle aligned with the line of weld, and rigidly secured to said first mentioned nozzle in tandem relation therewith, for projecting inert gas onto the welded joint after the arc has passed on.

4. In apparatus for inert gas shielded arc welding of difficult to weld metals in which the arc forms a weld puddle, the weld puddle is shielded by a stream containing essentially noble monatomic gas, and a rod of the same metal as that being welded is fed through a guide tube by a rod feeding mechanism, the improvement which comprises said guide tube also constituting a gas tube, a gas directing nozzle at the end of said guide tube toward the arc for directing gas from said tube to shield the weld puddle, a gas inlet for said guide tube spaced away from said nozzle for supplying gas to fill said tube and flow along the moving rod on its way to said nozzle, and a cooling jacket mounted on said gas and rod guide tube adjacent the gas and rod directing nozzle at the gas and rod discharge end thereof.

HARRY T. HERBST.

References Cited in the file of this patent

UNITED STATES PATENTS

| Number | Name | Date |
|---|---|---|
| 2,091,308 | Catlett | Aug. 31, 1937 |
| 2,274,631 | Meredith | Feb. 24, 1942 |
| 2,360,160 | Pickhaver | Oct. 10, 1944 |
| 2,411,465 | Richardson | Nov. 19, 1946 |
| 2,496,347 | Herbst | Feb. 7, 1950 |
| 2,571,684 | Craven | Oct. 16, 1951 |

FOREIGN PATENTS

| Number | Country | Date |
|---|---|---|
| 496,464 | Germany | May 21, 1930 |

OTHER REFERENCES

Pilia: The Welding Engineer, vol. 37, No. 4, April 1952, p. 54, He Dig.